(12) United States Patent
Kennepohl et al.

(10) Patent No.: US 9,103,216 B2
(45) Date of Patent: Aug. 11, 2015

(54) TURBINE OF A GAS TURBINE

(75) Inventors: Fritz Kennepohl, Unterschleissheim (DE); Detlef Korte, München (DE)

(73) Assignee: MTU AERO ENGINES GMBH, Munich (DE)

( * ) Notice: Subject to any disclaimer, the term of this patent is extended or adjusted under 35 U.S.C. 154(b) by 1203 days.

(21) Appl. No.: 12/441,030

(22) PCT Filed: Sep. 1, 2007

(86) PCT No.: PCT/DE2007/001572
§ 371 (c)(1),
(2), (4) Date: Mar. 5, 2010

(87) PCT Pub. No.: WO2008/031395
PCT Pub. Date: Mar. 20, 2008

(65) Prior Publication Data
US 2010/0202890 A1 Aug. 12, 2010

(30) Foreign Application Priority Data
Sep. 12, 2006 (DE) .......................... 10 2006 042 647

(51) Int. Cl.
*F01D 5/18* (2006.01)
*F01D 5/16* (2006.01)

(52) U.S. Cl.
CPC .. *F01D 5/16* (2013.01); *F01D 5/18* (2013.01); *F05D 2230/21* (2013.01); *F05D 2260/96* (2013.01); *Y02T 50/671* (2013.01); *Y02T 50/673* (2013.01); *Y02T 50/676* (2013.01)

(58) Field of Classification Search
CPC ........... F01D 5/18; F01D 5/182; F01D 5/183; F01D 5/187; F01D 5/188

USPC ............ 415/115, 119; 416/90 R, 96 R, 97 R, 416/231 R
See application file for complete search history.

(56) References Cited

U.S. PATENT DOCUMENTS

| 1,829,674 | A | | 10/1931 | Rosenlocher |
|---|---|---|---|---|
| 3,527,543 | A | * | 9/1970 | Howald ...................... 416/90 R |
| 4,021,139 | A | * | 5/1977 | Franklin ..................... 416/97 R |
| 4,303,374 | A | * | 12/1981 | Braddy ........................ 416/97 R |
| 4,669,957 | A | * | 6/1987 | Phillips et al. .............. 416/97 R |
| 4,672,727 | A | * | 6/1987 | Field ........................ 29/889.721 |

(Continued)

FOREIGN PATENT DOCUMENTS

| DE | 3505823 A1 | 8/1986 |
|---|---|---|
| EP | 1 548 229 A2 | 6/2005 |

(Continued)

*Primary Examiner* — Liam McDowell
(74) *Attorney, Agent, or Firm* — Greer, Burns & Crain, Ltd.

(57) ABSTRACT

A turbine of a gas turbine, in particular of a gas turbine aircraft engine, having a rotor that has at least one moving blade ring and having a stator that has at least one guide blade ring, moving blades of the, or each, moving blade ring and/or guide blades of the, or each, guide blade ring being fashioned as hollow blades having at least one cavity, wherein on at least one side of at least one moving blade and/or guide blade fashioned as a hollow blade, in a blade wall holes are made that connect the, or each, cavity to the surrounding environment of the respective moving blade and/or guide blade, so that the respective cavity can be used as a resonator or sound muffler in order to reduce the sound radiated by the turbine during operation.

6 Claims, 4 Drawing Sheets

(56) References Cited

U.S. PATENT DOCUMENTS

| | | | |
|---|---|---|---|
| 4,971,521 A * | 11/1990 | Atarashi et al. | 416/233 |
| 5,480,284 A * | 1/1996 | Wadia et al. | 416/91 |
| 6,004,095 A * | 12/1999 | Waitz et al. | 415/119 |
| 6,139,259 A | 10/2000 | Ho et al. | |
| 6,422,819 B1 * | 7/2002 | Tsai et al. | 416/97 R |
| 6,530,416 B1 * | 3/2003 | Tiemann | 164/137 |
| 2006/0067821 A1 * | 3/2006 | Wadia et al. | 416/97 R |

FOREIGN PATENT DOCUMENTS

| | | |
|---|---|---|
| GB | 1 225 771 | 3/1971 |
| GB | 2 026 622 A | 2/1980 |
| GB | 2 361 035 A | 10/2001 |
| JP | 59218302 A | 12/1984 |

* cited by examiner

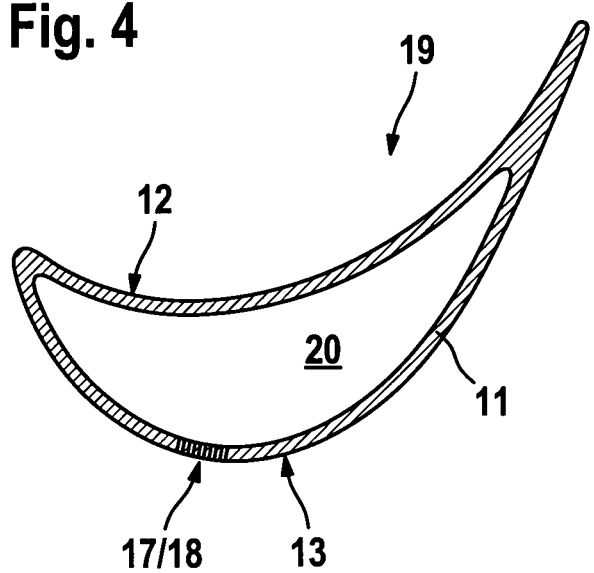
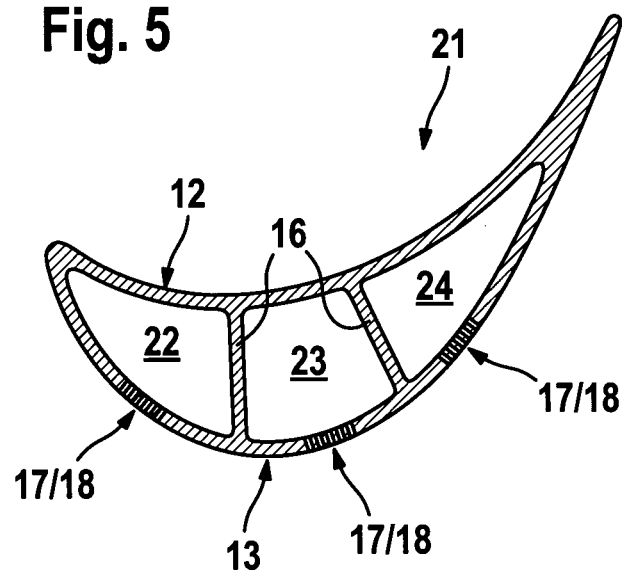

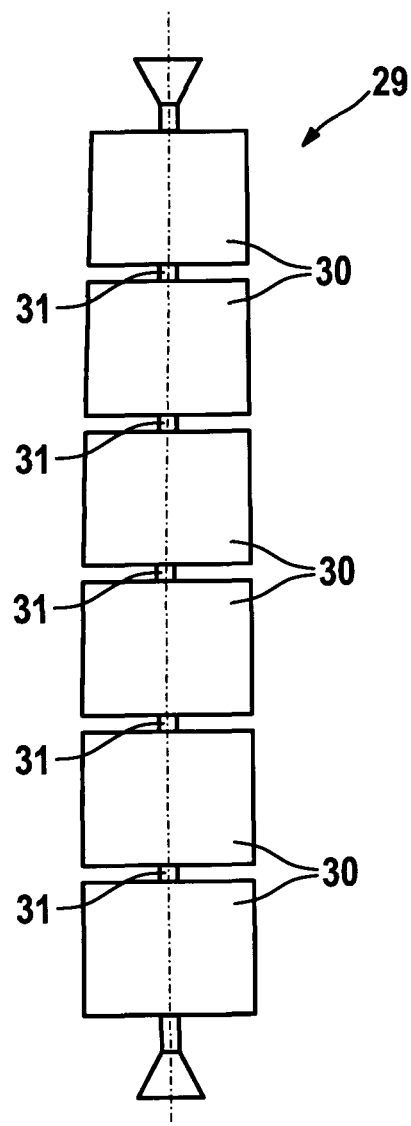

TURBINE OF A GAS TURBINE

The present invention relates to a turbine of a gas turbine, in particular of a gas turbine aircraft engine, as recited in the preamble of patent claim 1.

A gas turbine, in particular a gas turbine aircraft engine, has at least one compressor, at least one combustion chamber, and at least one turbine. The sound radiated by a gas turbine during operation, perceived as noise, is produced for the most part in the, or each, turbine of the gas turbine; for this reason, turbines having reduced sound radiation are desirable in order to reduce the noise produced by a gas turbine. For this purpose, in the prior art sound mufflers are used that are fashioned as separate components in the outlet ducts of the turbines of gas turbines. These sound mufflers increase the weight and cost of the turbines.

Based on the foregoing, the present invention addresses the problem of creating a new type of turbine of a gas turbine that has reduced sound radiation and that results in no additional weight and no increase in costs. This problem is solved by a turbine as recited in Claim 1. According to the present invention, on at least one side of at least one moving blade fashioned as a hollow blade, and/or of at least one guide blade fashioned as a hollow blade, holes are made in a blade wall that connect the, or each, cavity of the hollow blade with the environment surrounding the respective moving blade and/or guide blade, so that the respective cavity can be used as a resonator or sound muffler in order to reduce the sound radiated by the turbine during operation.

The construction of a turbine according to the present invention makes it possible to effectively reduce the sound radiated by the turbine during operation without increasing the weight of the gas turbine. Practically no additional costs are incurred. In addition, turbines already in use can easily be retrofitted during maintenance or repair.

Preferably, the holes are made exclusively on the inlet side in the blade wall of the, or each, moving blade and/or guide blade, in the form of at least one strip that extends in the radial direction.

The width of the, or each, strip, and the volume of the, or each, cavity, and the cross-sectional surface of the holes of the, or each, strip are preferably adjusted to one another in order to achieve an optimized impedance of the respective resonator or sound muffler.

According to an advantageous development of the present invention, the, or each, moving blade and/or guide blade fashioned as a hollow blade has, seen in the radial direction thereof, a plurality of cavities that are separated from each other, such that the, or each, strip formed by the holes extends in the radial direction over a plurality of cavities, and is interrupted in the area of walls that separate the cavities from each other.

Preferred developments of the present invention result from the subclaims and the following description. Exemplary embodiments of the present invention are explained below on the basis of the drawing, without being limited thereto.

FIG. 4 shows a cross-section through a blade of a turbine according to the present invention, according to a third exemplary embodiment;

FIG. 5 shows a cross-section through a blade of a turbine according to the present invention, according to a fourth exemplary embodiment; and FIG. 6 shows a casting core for the manufacture of a blade of a turbine according to the present invention.

The present invention relates to a turbine of a gas turbine, in particular of a gas turbine aircraft engine. Gas turbines have at least one compressor, at least one combustion chamber, and at least one turbine.

A turbine comprises a rotor that has at least one moving blade ring and a stator that has at least one guide blade ring, a rotor-side moving blade ring being positioned between each two adjacent, stationary guide blade rings. The moving blade rings of the rotor are formed by moving blades and the guide blade rings of the stator are formed by guide blades; both the moving blades and the guide blades of turbines may be fashioned as hollow blades. Such hollow blades have at least one cavity.

Figure 1:
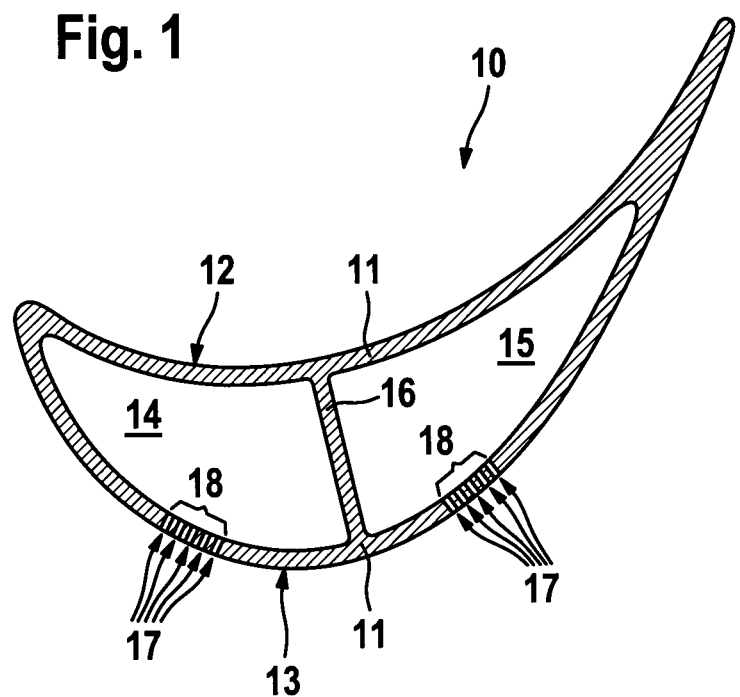
FIG. 1 shows a cross-section through a blade of a turbine according to the present invention, according to a first exemplary embodiment.

FIG. 1 shows a cross-section through a rotor-side moving blade, fashioned as hollow blade 10, of a turbine according to the present invention. According to FIG. 1, hollow blade 10 has a blade wall 11 that separates a pressure side 12 and a suction side 13 of moving blade 10. In the exemplary embodiment shown in FIG. 1, the moving blade fashioned as hollow blade 10 has two cavities 14 and 15 that are separated from one another by a web 16 that extends between pressure side 12 and suction side 13, said cavities preferably extending over the entire radial height of moving blade 10.

In the exemplary embodiment shown in FIG. 1, holes 17 are made in blade wall 11 in the area of suction side 13, said holes connecting cavities 14 and 15 of hollow blade 10 to the surrounding environment, so that cavities 14 and 15 of hollow blade 10 can function as a resonator or sound muffler, thus minimizing the sound radiated outward during operation of the turbine.

Holes 17 are made in blade wall 11 in the area of suction side 13, in the form of at least one strip 18 that extends in the radial direction of hollow blade 10 and thus of cavities 14, 15. According to FIG. 1, one such strip 18 is made in side wall 11 both in the area of cavity 14 and in the area of cavity 15. Each such strip is made up of a large number of holes 17 situated in the radial direction and alongside one another, i.e., the direction transverse to the radial direction.

The width of strips 18, the volumes of cavities 14 and 15, and the cross-sectional surface defined by holes 17 of strips 18 are adjusted to one another in order to achieve an optimized impedance of the resonator or sound muffler formed by cavities 14 and 15. In this way, an optimized sound muffling in the hollow blades can be achieved.

In the exemplary embodiment shown in FIG. 1, the moving blade fashioned as hollow blade 10 has two cavities 14 and 15, situated alongside one another in cross-section, and preferably extending (as already mentioned) over the entire radial height of hollow blade 10. The number of cavities situated adjacent to one another in cross-section is however arbitrary. Thus, FIG. 4 shows a moving blade, fashioned as hollow blade 19, of a turbine that has only one cavity. FIG. 5 shows a moving blade 21 of a turbine, having three adjacent cavities 22, 23, and 24.

However, because moving blades 19, 21 of FIGS. 4, 5 are identical to moving blade 10 of FIG. 1 with regard to all other details, in order to avoid unnecessary repetition identical reference characters have been used for identical assemblies, so that reference may be made to the descriptions above.

Figure 2:
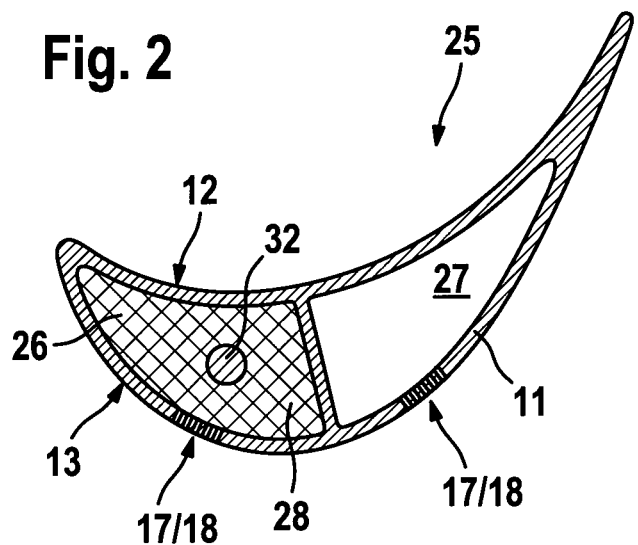
FIG. 2 shows a cross-section through a blade of a turbine according to the present invention, according to a second exemplary embodiment.
Figure 3:
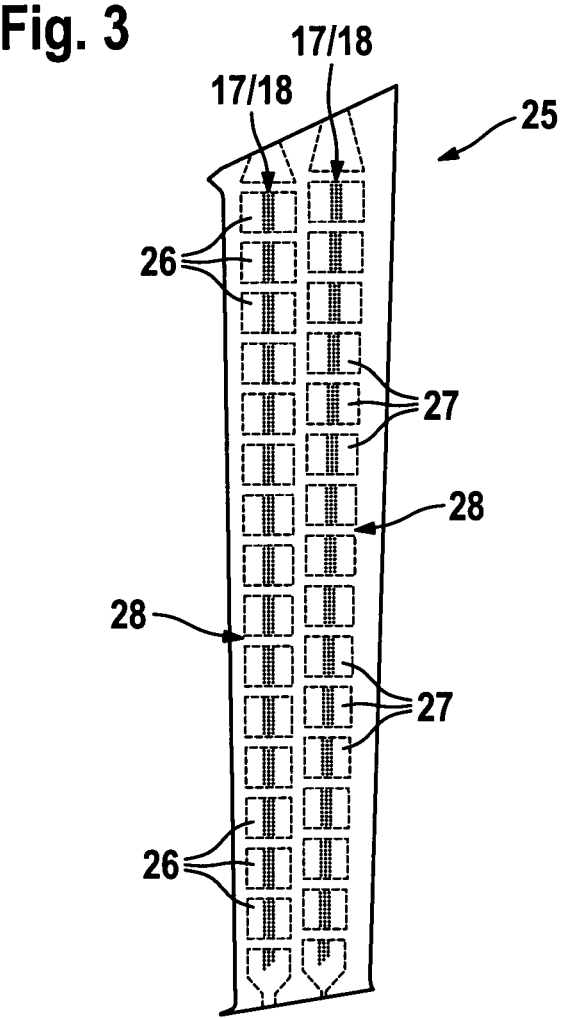
FIG. 3 shows a side view of the blade according to FIG. 2.

FIGS. 2 and 3 show another variant of a moving blade, fashioned as hollow blade 25, of a turbine, having, like hollow blade 10 of FIG. 1, two cavities situated adjacent to one another (seen in cross-section). However, these cavities 26 and 27 do not extend over the entire radial height of hollow blade 25; rather, seen over the radial height thereof, a plurality of such cavities 26 and 27 are situated one over the other and are separated from one another by walls 28 that run perpendicular to the radial direction of the turbine. This makes it possible to carry out an adjustment of cavities 26 and 27, acting as resonators or sound mufflers, to the frequency of the sound that is to be muffled.

As can be seen in particular in FIG. 3, strips 18 made up of holes 17 extend over the radial height of hollow blade 25; strips 18 are interrupted in the area of walls 28 that separate cavities 26 and 27, which are situated adjacent to each other in the radial direction.

In the exemplary embodiment shown in FIGS. 1 through 5, on suction side 13 there extends in the area of each cavity a strip 18 made up of holes 17. It is also possible for a plurality of strips running parallel to one another to extend in the area of each cavity.

In the exemplary embodiments of FIGS. 1 through 5, the depicted hollow blades are fashioned as rotor-side moving blades. It is to be noted that stator-side guide blades, such as those described in connection with the moving blades, may also be realized.

As stated above, a turbine standardly comprises a plurality of rotating moving blade rings and a plurality of stationary guide blade rings. Preferably, in the area of at least one moving blade ring and/or in the area of at least one guide blade ring, each moving blade and/or each guide blade is fashioned in accordance with the above-explained designs. In particular, those moving blade rings and/or guide blade rings in which the loudest, or most noise-relevant, sound is produced are fashioned in accordance with the above design principles.

During turbine testing, modal measurement techniques may be used to identify those guide blade rings and/or moving blade rings in which in which the loudest, or most noise-relevant, sound is produced.

The moving blades and/or guide blades of a turbine realized in accordance with the present invention bring about both a reduction of sound production at the source at which the sound arises, by reducing the unsteady pressures on the blade surface caused by aerodynamic interaction between the rotor and the stator, and also an increase in sound attenuation relating to the propagation of the sound produced by turbine blades or turbine stages situated further downstream.

The guide blades or moving blades, fashioned as hollow blades, of a turbine are fashioned together with the cavities by casting, in particular precision casting. In order to manufacture a hollow blade according to FIGS. 2 and 3, having a plurality of cavities separated from one another (seen in the radial direction), casting core 29 shown in FIG. 6 may be used. Casting core 29 shown in FIG. 6 comprises a plurality of partial cores 30 situated one over the other that are used to fashion the cavities, partial cores 30 being connected to one another by webs 31. In the walls 28 that are fashioned during the casting and that separate the cavities of the blade from one another, webs 31 form recesses, these recesses being sealed after the casting, so that all cavities are completely separated from one another. The sealing of the holes in walls 28 may be accomplished using bolts 32 (see FIG. 2) that are for example inserted or screwed into the recesses.

The invention claimed is:

1. A turbine of a gas turbine aircraft engine comprising:
a plurality of moving blades and guide blades, each of said moving blades and said guide blades having a radial height extending along a radial axis from a base to a tip of each of said moving blades and said guide blades, and being fashioned as hollow blades having a plurality of cavities, wherein each of said cavities extend along an entire radial height of each of said respective moving blades and said guide blades,
at least one side of a blade wall of at least one of said moving blades or said guide blades defines a plurality of holes, said holes forming at least two separate strips extending in a radial direction along the entire radial height of each of said respective moving blades or said guide blades, wherein each of said strips includes a plurality of said holes, said holes including a plurality of radially aligned holes that extend along said radial axis and a plurality of transversely aligned holes that extend in a direction transverse to said radial axis, said at least two strips are each associated with a single one of said cavities and configured to connect a different one of said cavities to the surrounding environment of said respective moving blade or guide blade, so that the respective cavity can be used as a resonator or sound muffler to reduce sound radiated by the turbine during operation.

2. The turbine as recited in claim 1, wherein each of said moving blades and said guide blades includes a suction side and a pressure side, said plurality of holes being located exclusively on said suction side.

3. The turbine as recited in claim 1, wherein a width of said at least one strip, a volume of each of said cavities and a cross-sectional surface of said plurality of holes of each strip are adjusted relative to one another to achieve an optimized impedance of the respective resonator or sound muffler.

4. The turbine as recited in claim 1, wherein each moving blade or guide blade is manufactured by precision casting.

5. The turbine as recited in claim 1, wherein the holes of the plurality of moving blades or the plurality of guide blades are located in an area where the turbine produces the loudest or most noise-relevant sound.

6. A turbine of a gas turbine aircraft engine comprising:
a plurality of moving blades and guide blades, each of said moving blades and said guide blades having a radial height extending along a radial axis from a base to a tip of each of said moving blades and said guide blades, and being fashioned as hollow blades having at least two sets of separated cavities extending in a radial direction,
at least one side of a blade wall of at least one of said moving blades or said guide blades defines a plurality of holes, said holes forming at least two strips extending in the radial direction along an entire radial height of each of said respective moving blades or said guide blades wherein each of said strips includes a plurality of said holes, said holes including a plurality of radially aligned holes that extend along said radial axis and a plurality of transversely aligned holes that extend in a direction transverse to said radial axis, said at least two strips are each associated with a single one of said cavities and configured to connect a different one of said sets of separated cavities to the surrounding environment of said respective moving blade or guide blade, so that the respective cavity can be used as a resonator or sound muffler to reduce sound radiated by the turbine during operation.

\* \* \* \* \*